United States Patent
Lowe-Power et al.

(10) Patent No.: US 10,713,165 B2
(45) Date of Patent: Jul. 14, 2020

(54) ADAPTIVE COMPUTER CACHE ARCHITECTURE

(71) Applicant: Wisconsin Alumni Research Foundation, Madison, WI (US)

(72) Inventors: Jason Lowe-Power, Madison, WI (US); David A. Wood, Madison, WI (US); Mark D. Hill, Madison, WI (US)

(73) Assignee: WISCONSIN ALUMNI RESEARCH FOUNDATION, Madison, WI (US)

( * ) Notice: Subject to any disclaimer, the term of this patent is extended or adjusted under 35 U.S.C. 154(b) by 137 days.

(21) Appl. No.: 15/894,164

(22) Filed: Feb. 12, 2018

(65) Prior Publication Data

US 2019/0251026 A1  Aug. 15, 2019

(51) Int. Cl.
*G06F 12/0804* (2016.01)

(52) U.S. Cl.
CPC .. *G06F 12/0804* (2013.01); *G06F 2212/1021* (2013.01); *G06F 2212/1032* (2013.01)

(58) Field of Classification Search
None
See application file for complete search history.

(56) References Cited

U.S. PATENT DOCUMENTS

| 8,543,766 B2 * | 9/2013 | Grayson | G06F 12/0804 711/135 |
| 2017/0277636 A1 * | 9/2017 | Lee | G06F 12/126 |

* cited by examiner

*Primary Examiner* — Michael Alsip
(74) *Attorney, Agent, or Firm* — Boyle Fredrickson, S.C.

(57) ABSTRACT

A high-bandwidth adaptive cache reduces unnecessary cache accesses by providing a laundry counter indicating whether a given adaptive cache region has any dirty frames to allow write-back without a preparatory adaptive cache read. An optional laundry list allows the preparatory adaptive cache read to also be avoided if the tags of the data being written back match all tags of the data in the adaptive cache that is dirty.

19 Claims, 7 Drawing Sheets

FIG. 9

| # | LAUNDRY COUNT ==0? (202) | LAUNDRY LIST SUPER-FRAME TAG MATCH? (204) | LAUNDRY LIST PHYSICAL TAG MATCH? (205) | LL FRAME DIRTY BIT SET? (206) | CACHE BLOCK TAG MATCH? (207) | CACHE BLOCK DIRTY? (208) | DATA MODIFIED IN LLC? (210) | READ TAG & DATA FROM DRAM CACHE (214) | WRITEBACK VICTIM (215) | CREATE NEW LAUNDRY LIST ENTRY (216) | SET DIRTY BIT IN LAUNDRY LIST ENTRY (217) | INVALIDATE THE LAUNDRY LIST ENTRY (218) | DECREMENT LAUNDRY COUNT (219) | INCREMENT LAUNDRY COUNT (220) | WRITE TAG & DATA INTO DRAM CACHE (221) | Group |
|---|---|---|---|---|---|---|---|---|---|---|---|---|---|---|---|---|
| 1 | YES | – | – | – | – | – | YES | | ✓ | ✓ | | | | ✓ | ✓ | A |
| 2 | YES | – | – | – | – | – | NO | | | | | | | | ✓ | A |
| 3 | NO | YES | YES | YES | – | – | YES | | | | | | | | ✓ | B |
| 4 | NO | YES | YES | YES | – | – | NO | ERROR / INVALID | | | | | | | | B |
| 5 | NO | YES | YES | NO | – | – | YES | | | | ✓ | | | ✓ | ✓ | B |
| 6 | NO | YES | YES | NO | – | – | NO | | | | | | | | ✓ | B |
| 7 | NO | YES | NO | YES | YES | YES | YES | ERROR / INVALID | | | | | | | | C |
| 8 | NO | YES | NO | YES | YES | YES | NO | ERROR / INVALID | | | | | | | | C |
| 9 | NO | YES | NO | YES | YES | NO | – | ERROR / INVALID | | | | | | | | C |
| 10 | NO | YES | NO | YES | NO | YES | YES | ✓ | ✓ | | | ✓ | ✓ | ✓ | ✓ | C |
| 11 | NO | YES | NO | YES | NO | YES | NO | ✓ | ✓ | | | ✓ | | ✓ | | C |
| 12 | NO | YES | NO | YES | NO | NO | YES | ERROR / INVALID | | | | | | | | C |
| 13 | NO | YES | NO | YES | NO | NO | NO | ERROR / INVALID | | | | | | | | C |
| 14 | NO | YES | NO | NO | – | – | YES | | | | ✓ | | | ✓ | ✓ | C |
| 15 | NO | YES | NO | NO | – | – | NO | | | | | | | | ✓ | C |
| 16 | NO | NO | – | – | YES | YES | YES | ✓ | | | | | | | ✓ | D |
| 17 | NO | NO | – | – | YES | YES | NO | ✓ | ERROR / INVALID | | | | | | | D |
| 18 | NO | NO | – | – | YES | NO | YES | ✓ | | | | | | ✓ | ✓ | D |
| 19 | NO | NO | – | – | YES | NO | NO | ✓ | ERROR / INVALID | | | | | | | D |
| 20 | NO | NO | – | – | NO | YES | YES | ✓ | ✓ | | | ✓ | | ✓ | ✓ | D |
| 21 | NO | NO | – | – | NO | YES | NO | ✓ | ✓ | | | ✓ | | | ✓ | D |
| 22 | NO | NO | – | – | NO | NO | YES | ✓ | | | | | | ✓ | ✓ | D |
| 23 | NO | NO | – | – | NO | NO | NO | ✓ | | | | | | | ✓ | D |

ADAPTIVE COMPUTER CACHE ARCHITECTURE

STATEMENT REGARDING FEDERALLY SPONSORED RESEARCH OR DEVELOPMENT

This invention was made with government support under 1533885 and 1617824 awarded by the National Science Foundation. The government has certain rights in the invention.

BACKGROUND OF THE INVENTION

The present invention relates to computer architectures and in particular to an adaptive cache suitable for use with high-bandwidth memory in a computer cache system.

The processing speed of modern computers is constrained by the time it takes for data to be transferred between computer memory and the computer processor, e.g. "latency". Such latency can be reduced through the use of cache memories which provide small, fast data storage structures close to the processor. When data is required by the processor, it looks first at the cache memories to see if the necessary data has been previously loaded from a larger but slower main memory. If data is found in the cache memory, the need to access the slower main memory can be avoided.

The success of this strategy relies on the ability to anticipate what data will be required by the processors in the future so that this data may be preloaded into cache memory. Such predictions usually rely on the principle of "locality of reference" meaning that data likely to be used by the processor in the future will be local to the data currently used by the processor. Implementing the strategy requires simply loading blocks of data into the cache around the data currently being used by the processor.

Often the cache memories are constructed of static random-access memory (SRAM) which is generally faster than the dynamic random-access memory (DRAM) used for the larger main memory. Also, typically the cache is relatively small to provide for fast access and as an accommodation to the larger memory cell size of SRAM memory.

High-performance scientific computing (HPC) requires high memory bandwidths particularly when executed on highly parallel architectures like those found in graphic processing units or multi-core processors. Bandwidth refers to the amount of data transmitted per unit time and is distinct from latency which indicates how fast a given piece of data may be accessed. High memory bandwidths may be promoted using special caches constructed of high-bandwidth memory technologies (HBM) using DRAM and new technologies of three-dimensional die stacking in which semiconductor dies holding the memory circuitry are stacked vertically with vertical interconnections through-silicon vias. These HBM memories have sufficient storage capacity to implement high-bandwidth caching but invoke a latency penalty because of the use of DRAM rather than SRAM memory.

SUMMARY OF THE INVENTION

The present inventors have recognized that the latency penalty of an HBM memory cache can be mitigated by implementing the HBM memory as an adaptive cache which eliminates ancillary cache accesses needed under normal caching protocols. Generally, the adaptive cache uses a separate high-speed memory to track dirty blocks within portions of the adaptive cache. In certain cases, this tracking allows writing to the adaptive cache without a time-consuming "pre-reading" of the adaptive cache to identify "dirty" cache frames that need to be handled before the writing. By eliminating this auxiliary access of the adaptive cache before a writing to the adaptive cache, the effective latency of the adaptive cache, and hence of the HBM memory, is substantially reduced.

More specifically, one embodiment of the invention provides a cache architecture having an adaptive cache with regions holding cache frames storing data blocks cached from a main memory for use by one or more processors. Each cache frame is associated with a dirty bit that is set when the cache frame holds data that has been changed by a processor but has not been updated in the main memory and that is reset otherwise. The cache architecture also includes a laundry counter associated with each region storing a count value. A cache controller operates to: (a) update the laundry counters during operation of the cache architecture to indicate whether an associated region has any set dirty bits; (b) write data to a given cache frame in the region in a first mode without first reading the dirty bit of the cache frame when the associated laundry counter indicates no dirty frames in the region; and (c) write data to a given cache frame in a second mode when the associated laundry counter indicates at least one dirty frame in the region after first reading the dirty bit of the given cache frame to ensure that the given cache frame dirty bit is not set.

It is thus a feature of at least one embodiment of the invention to eliminate the need to read the adaptive cache before writing to the adaptive cache when a portion of the adaptive cache written to is "clean," that is, having no dirty frames, thereby reducing the practical latency of the HBM cache.

The laundry counter may indicate a number of dirty bits in the region and may be incremented when new cache frames having dirty bits are added to the cache and decremented when old cache frames having dirty bits are removed from the cache.

It is thus a feature of at least one embodiment of the invention to allow the laundry counter to track the number of dirty frames as this number increases and decreases during cache use to readily determine when the cache portion is clean without the need for special cache interrogation circuitry.

The cache controller may operate in the second mode to write-back data of the given cache frame to the main memory before writing data to the cache frame when the reading of the dirty bit of a given cache frame indicates that the dirty bit is set and a data block of the given cache frame does not match a data block of data being written back to the given cache frame.

It is thus a feature of at least one embodiment of the invention to allow the cache architecture to revert to standard cache protocols in cases where the cache portion is not clean.

The laundry counter may be held in a separate memory from a memory holding the cache, the separate memory providing faster access by the processor than the memory holding the cache. In one example, the laundry counter may be held in a static random-access memory (SRAM) and the adaptive cache may be held in a dynamic random-access memory (DRAM). In some embodiments, the DRAM may employ a three-dimensional, die-stacking integrated circuit architecture.

It is thus a feature of at least one embodiment of the invention to permit the laundry counter to be accessed with less time penalty than the adaptive cache, thereby providing a speed advantage in reading the laundry counter over reading the adaptive cache prior to a writing to the adaptive cache. It is another feature of at least one embodiment of the invention to permit the use of DRAM for high-capacity, high-bandwidth caches while reducing the latency penalty associated with such memory types.

The cache frames of the cache may be further associated with tags corresponding to addresses in main memory of the data held in the cache frames, and the cache architecture may further include a laundry list indicating a tag of a cache frame associated with a set dirty bit. The cache controller may further operate to write data having a given tag to a given cache frame in a third mode without first reading the dirty bit of the cache frame when tag of the given cache frame is in the laundry list.

It is thus a feature of at least one embodiment of the invention to permit fast writing to a portion of the adaptive cache without a pre-reading of data of the adaptive cache even when the portion of the adaptive cache is not clean, when the dirty bits are linked to the same memory block as the data being written.

The laundry list may be held in separate memory from a memory holding the cache, the separate memory providing faster access by the processor than the memory holding the cache.

It is thus a feature of at least one embodiment of the invention to permit the laundry list to be accessed with less time penalty than the adaptive cache, thereby providing a speed advantage in reading the laundry list over reading the adaptive cache prior to a writing to the adaptive cache.

The laundry list may be held in a laundry list cache providing fewer laundry list entries than regions of the cache.

It is thus a feature of at least one embodiment of the invention to substantially reduce the storage burden for the laundry list allowing it to be stored in small SRAM memory. This small cache may be implemented without access penalties associated with normal cache misses because there is no correctness penalty for the missing laundry list; the cache simply reverts to normal protocol operation.

The cache controller may schedule a write-back of data written into the adaptive cache to main memory at the time of writing of data to the adaptive cache.

It is thus a feature of at least one embodiment of the invention to minimize dirty frames in the adaptive cache to promote operation of the adaptive cache in the first or third modes having lower effective cache latency.

The schedule of the write-back of dirty cache frames may be based on a measurement of a flow of data between the main memory and the one or more processors.

It is thus a feature of at least one embodiment to prevent the opportunistic write-backs of dirty frames from interfering with primary memory traffic.

The cache controller may further operate to write-back dirty cache frames to the main memory on a predetermined schedule independently of writing to the cache from the processor.

It is thus a feature of at least one embodiment of the invention to provide background writes back to again minimize dirty cache frames for optimal performance.

The predetermined schedule may be coordinated with a refresh of dynamic adaptive cache memory.

It is thus a feature of at least one embodiment of the invention to piggyback the writes back with the required refresh of DRAM memory that may be used in the adaptive cache.

These particular objects and advantages may apply to only some embodiments falling within the claims and thus do not define the scope of the invention.

BRIEF DESCRIPTION OF THE DRAWINGS

FIG. 9 is a table showing a more complete representation of the operation of the cache controller of the adaptive cache.

DETAILED DESCRIPTION OF THE PREFERRED EMBODIMENT

Figure 1:
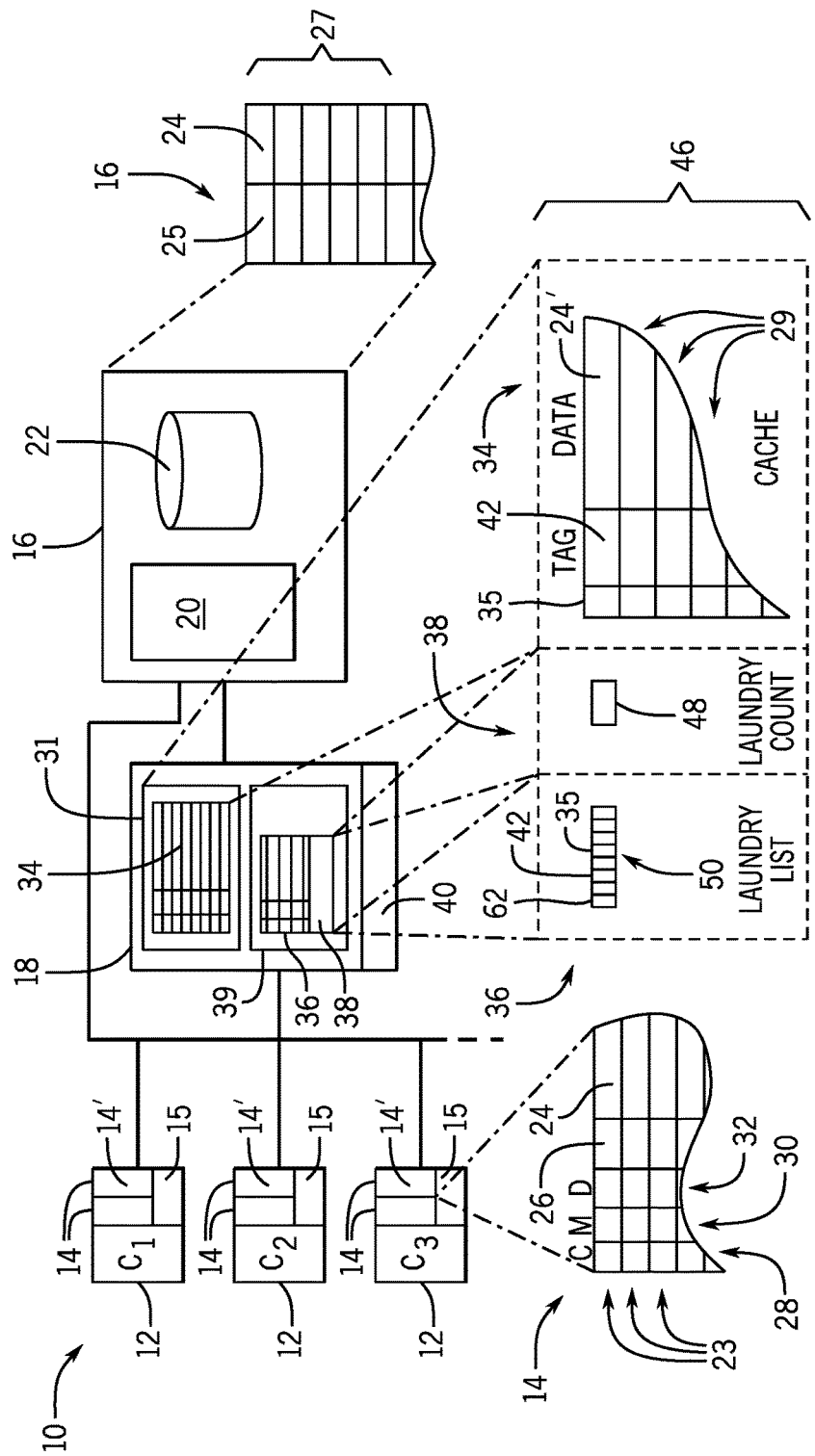
FIG. 1 is a simplified block diagram of a computer system providing multiple cores having associated lower-level caches communicating with a main memory through an adaptive cache system, and further showing logical structures of lower-level caches and the adaptive cache system, the latter including the adaptive cache, a laundry count, and a laundry list associated with super-frames of the adaptive cache.

Referring now to FIG. 1, a computer system 10 employing the present invention may provide for multiple processing cores 12, for example, each providing a general-purpose processor for execution of arithmetic and logical instructions and optionally including architectural features such as out-of-order processing, speculative execution, and the like.

Each of the cores 12 may be associated with one or more core-level caches 14 (for example, an L1 and L2 cache) as is generally understood in the art. The core-level caches 14 may be associated with cache controllers 15 which handle cache protocols and cache coordination as is generally understood in the art.

The core-level caches 14 for each core 12 may include a last level cache 14' which may communicate directly with a main memory 16 through one or more channels to exchange data therewith. The main memory 16, for example, will typically include a variety of memory types arranged in a hierarchical form including, for example, random access memory 20 and mass storage memory 22 such as provided by disk drives or the like. Logically, the main memory holds data 24 linked to physical addresses 25 uniquely identifying that data 24.

The core-level caches 14 for each core 12 may also communicate with the adaptive cache system 18, the latter of which also may communicate with main memory 16. As will be discussed below, blocks 27 of data 24 from of multiple physical addresses 25 may be cached by various of the core-level caches 14 and the adaptive cache system 18. In this regard, the main memory 16 will be shared by the cores 12 and the adaptive cache system 18 and will provide substantially more storage for data and instructions than available in the core-level caches 14 and adaptive cache system 18. Similarly, the adaptive cache system 18 will provide greater storage capacity than the caches 14.

Core-level caches 14 and particularly the last level cache 14' may provide for a set of cache frames 23 each holding data 24 and an address tag 26 identifying the data. The address tag 26 will be related to the physical address 25 in the main memory 16 holding data corresponding to the data 24 of which data 24 is a cached copy. The address tag 26 can be computed from the physical address 25 and the physical address 25 can be computed from the address tag 26 and the cache index. Each cache frame 23 may also be associated with a clean-evict bit 28, a modified bit 30, and a dirty bit 32 (or equivalent state data). The clean-evict bit 28 indicates whether the data 24 of the cache frame 23 is also stored in the adaptive cache system 18. This bit is set when the data is loaded from the adaptive cache system 18. The modified bit 30 indicates whether the data 24 of the cache frame 23 has been modified by the core 12 while it has been in the last level cache 14' (or any of the caches 14). Finally, the dirty bit 32 indicates whether the data 24 of the cache frame 23 has been modified after it was copied from memory 16 and thus needs to be ultimately written back to memory 16. The use of these bits will be discussed below.

The adaptive cache system 18 provides multiple data storage areas including an adaptive cache 34, a laundry list cache 36, and a laundry count storage array 38. In one embodiment, the adaptive cache 34 may be implemented using a high-bandwidth memory structure 31 such as 3-D die-stacked dynamic random-access memory (3-D DRAM). The laundry count storage array 38 and laundry list cache 36, in contrast, may be implemented in a static random-access memory (SRAM). Both of these data storage areas are controlled by a cache controller 40 whose operation will be discussed below. Generally, such 3-D DRAMs may provide multiple channels in contrast to the single channel shown and discussed with respect to FIG. 1. The invention contemplates that multiple channels may be accommodated by reproducing the structure of the "laundry count" and "laundry list", as will be described below, for each of the channels.

The adaptive cache 34, like the core-level caches 14 may provide for a set of cache frames 29 each holding data 24' (being a cached copy of data in memory 16), and a tag 42 reflecting the address of that data 24' in memory 16. Each cache frame 29 may be associated with a dirty bit 35 or equivalent state data indicating whether the data 24' of the adaptive cache 34 differs from its copy in main memory 16.

The cache frames 29 of the adaptive cache 34 may be grouped into multiple super-frames 46 each holding multiple cache frames 29. Each super-frame 46 is associated with a laundry counter 48 that indicates the number of dirty cache frames 29 associated with dirty bits 35 in the adaptive cache 34. Each super-frame 46 may also be associated with a laundry list 50 holding tag fields 62 and 42 and having a set of dirty bits 35 marking some of the cache frames 29 of the super-frame 46 which are dirty. These dirty bits 35 match the dirty bits 35 but are stored in a different memory structure which has significance with respect to access speed. For example, a super-frame 46 may include sixteen cache frames 29 in which case the laundry list 50 will hold sixteen bits that may be individually set to indicate particular dirty cache frames 29. The laundry list 50 provides a way of speeding cache writes back even if the caches not completely clean as will be discussed below.

Storage space may be allocated in the laundry count storage array 38 for each laundry counter 48 associated with each super-frame 46. In this way, the values of the laundry counter 48 may be rapidly accessed through the high-speed SRAM memory 39 indexed directly by the number of the super-frame 46.

Figure 2:
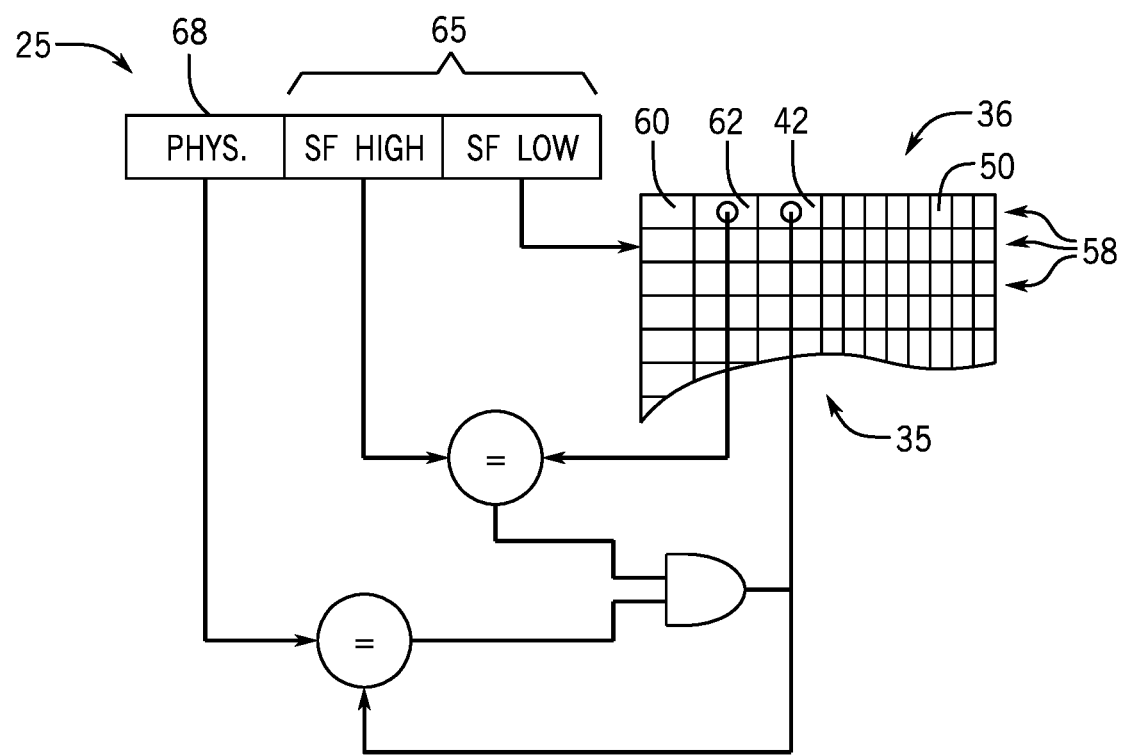
FIG. 2 is a logical diagram showing a laundry list cache structure holding the laundry lists.

Similarly, the laundry lists 50 may be stored in SRAM memory 39 but in a separate structure from the laundry counters 48 and, in one embodiment, in a laundry list cache 36. Referring now to FIG. 2, generally the laundry list cache 36 will have fewer entries 58 than there are super-frames 46 to greatly conserve space in the SRAM 39. The ability to store only a subset of the laundry list 50 is possible because correctness of operation does not require a laundry list 50 as will be noted below.

Each entry 58 of the laundry list cache 36 will include a valid bit 60 (indicating whether the remainder of the entry is valid), a super-frame tag 62, and a physical tag 42. The laundry list cache 36 may be accessed using the address 25 of data being written from the last level cache 14' to the adaptive cache system 18. This address 25 is also used in identifying a cache frame 29 in the adaptive cache 34 to receive the write-back data.

In accessing the laundry list cache 36, the cache controller 40 identifies a super-frame number 65 in an incoming address 25 associated with the write-back that identifies the super-frame 46. The lower ordered bits of the super-frame number 65 are then used to index the laundry list cache 36, and the higher ordered bits are used to compare to the tag 62 in the indexed entry 58 to confirm the necessary super frame is present in the laundry list cache 36. In addition, the physical tag 42 of the indexed entry 58 is compared to higher ordered address bits 68 of the incoming address 25 as is also required to confirm the necessary data (related to the same super-frame 46) is present in the laundry list cache 36 associated with the address 25. If the super-frame tag 62 does not match or the valid bit 60 is not set, the system operates as if there were no laundry list 54 for that super-frame 46, as will be discussed below. If the super-frame tag 62 does match and the valid bit 60 is set, the value of the laundry list 50 may be used, as will be discussed below.

Figure 3:
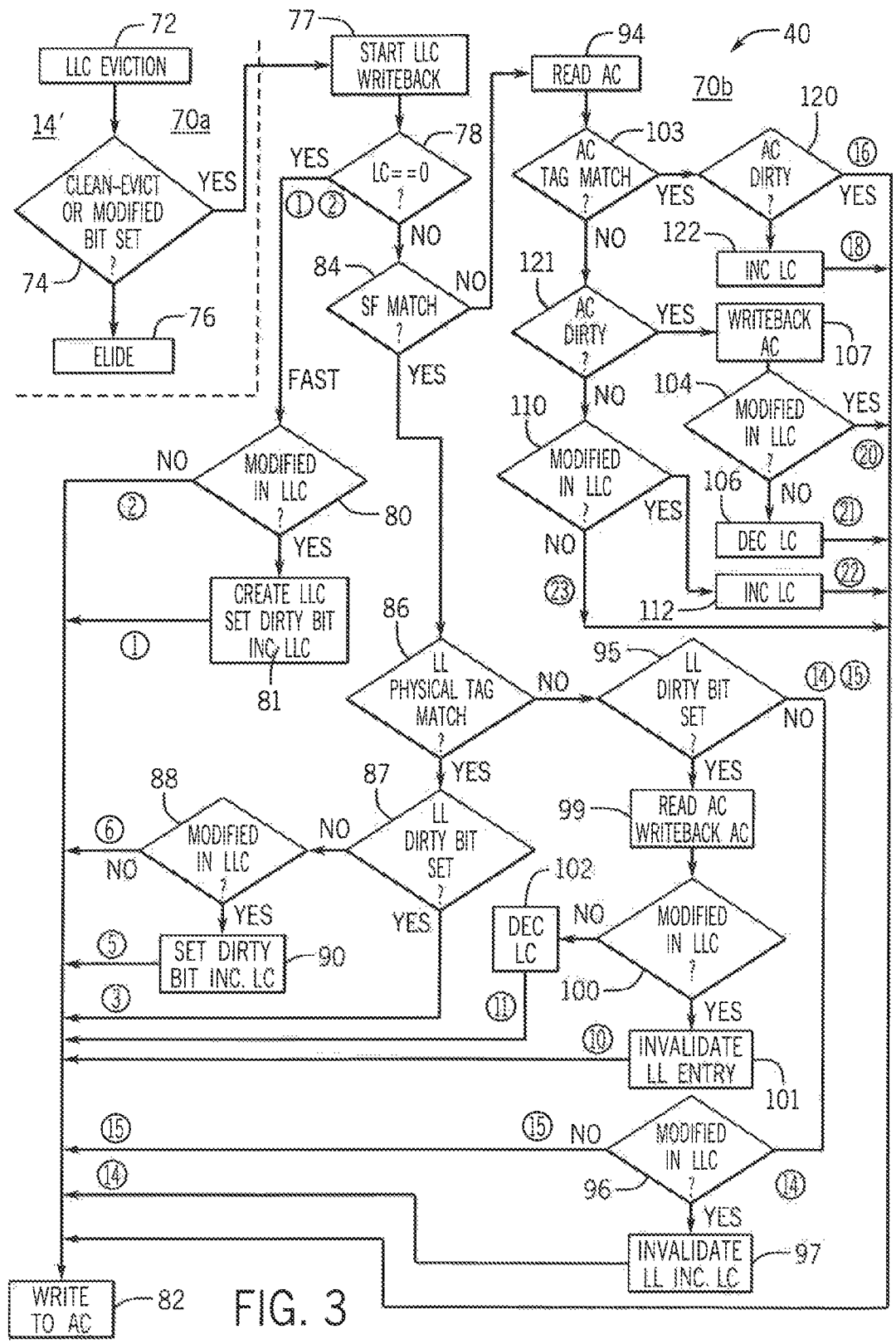
FIG. 3 is a simplified flowchart showing operation of the cache controllers of the lower-level caches and the adaptive cache system in handling a write-back from the lower-level caches to the adaptive cache system according to the present invention.

Referring now to FIGS. 1 and 3, the cache controller 40 of the adaptive cache system 18 operates in conjunction with the cache controllers 15 of the cores 12 to efficiently manage the writing of data from the last level cache 14' to the adaptive cache 34 while reducing the number of accesses to the adaptive cache 34 and hence the time taken for the transfer. In this regard, the last level cache 14' may operate according to programs 70a executed on cache controllers 15, and the adaptive cache system 18 may operate according the program 70b executed by cache controller 40. These programs will typically be implemented directly in gate logic for high-speed execution.

When the last level cache 14' needs to evict a cache frame 23, for example, because of space constraints in the last level cache 14', as indicated by process block 72, the last level cache 14' will review the clean-evict bit 28 and modified bit 30 of the cache frame 23 selected for eviction. This cache frame 23 is selected according to an eviction policy of the type generally understood in the art, for example, the oldest on accessed data.

If the clean-evict bit 28 is set or the modified bit 30 is set, as determined at decision block 74, a write-back of the data of this evicted cache frame 23 will be performed to the adaptive cache system 18 per process block 77. Otherwise, the write-back is "elided," at process block 76 meaning that the evicted cache frame 23 is overwritten in the last level cache 14' without a write-back of its data. This elision is possible because in this situation the data was not modified in the caches 14 (since the modified bit was set) and the data was previously written back to the adaptive cache system 18 (since the clean evict bit is not set). Thus the data 24 in cache 14 is the same as the data 24' stored in the adaptive cache system 18 (or main memory 20, if cache frame 29 has been evicted from adaptive cache system 18).

Figure 4:
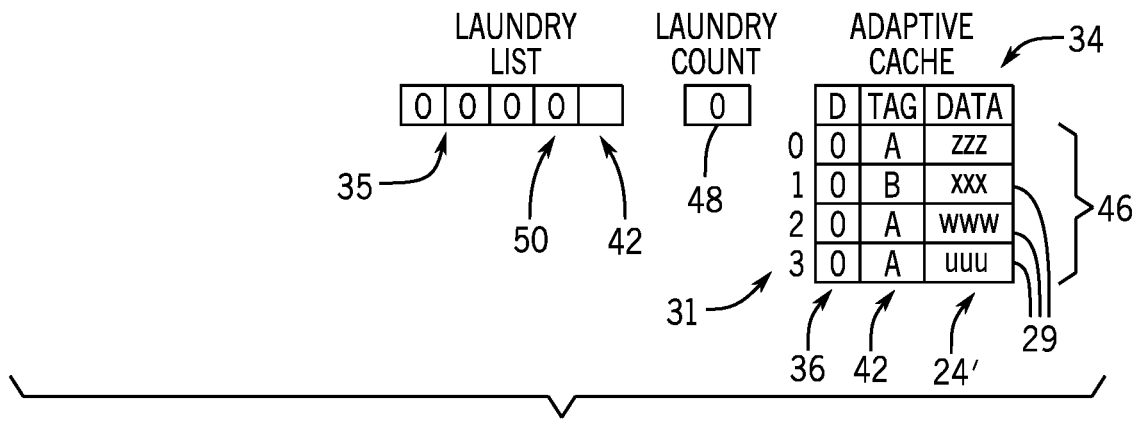
FIGS. 4-8 are logical representations of a super-frame of the adaptive cache and its associated laundry count and laundry list under different write-back circumstances from the lower-level caches to the adaptive cache.

Referring now to FIGS. 3 and 4, consider a super-frame 46 in the adaptive cache 34 having four cache frames 29 indexed 0-3 and each holding a single data 24'(zzz, xxx, www, and uuu) being a memory block 27, the data 24' having tags 42 A, B, A, and A respectively. The dirty bits 35 for each of the data 24' are reset indicating that the entire super-frame 46 is "clean" and thus all valid cache frames 29 contain the same data 24' as in main memory 20.

At this point, the laundry counter 48 will equal zero and then there will be no entry in the laundry list 50 consistent with the lack of dirty frames 29 indicated by all the dirty bits 35 being reset and as enforced by the program 70*b*. In this example each frame 29 uniquely identifies a memory block 27 by means of an address 25 formed of a combination of a tag 42 (e.g. A) in combination with the super-frame number 65 (e.g. S, not shown in this example for simplicity) and the index value 31 within the superframe (e.g. 0).

Figure 5:
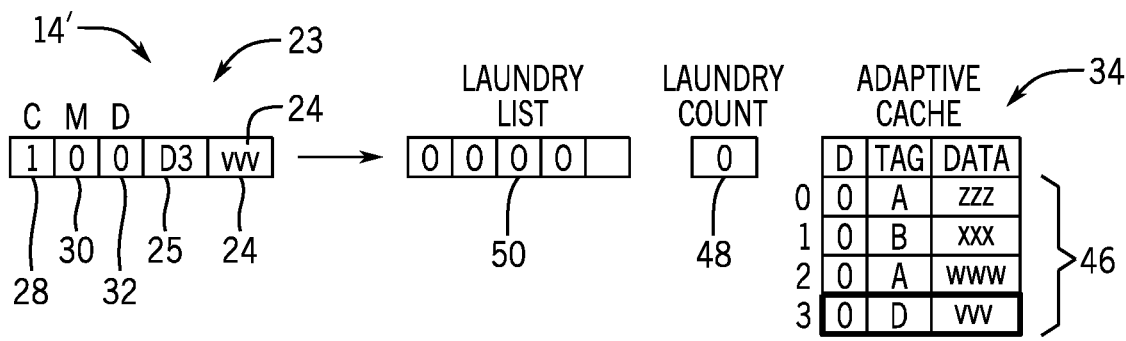

Referring now to FIGS. 3 and 5, a write-back of cache frame 23 having data 24 (vvv) may be requested by the last level cache 14' where this data was not modified or dirty in the last level cache 14' but is a clean-evict requiring it to be written to the cache 34. Upon this request, the cache controller 40 reads the laundry counter 48 from laundry count storage array 38 of the SRAM 39 for the given super-frame 46. Because the laundry counter 48 in this case is equal to zero, as determined by decision block 78, there is no need to read the adaptive cache system 18 to determine if the write-back will write over a dirty cache frame 29. Normally it is important to know if the cache frame 29 to be overwritten is dirty because in that case existing data would need to be written back to main memory 16 before the overwriting.

While it may be unlikely that the entire adaptive cache 34 will be clean, by partitioning the adaptive cache system 18 into super-frames 46 of the proper size, the likelihood of this state of the laundry count equal to zero (all cache blocks clean) becomes increasingly likely along with the ability to avoid an unnecessary reading of the adaptive cache 34.

After determination that the super-frame 46 is clean, program 70*b* proceeds to decision block 80 to determine if the data from the evicted cache frame 23 was modified in the last level cache 14' (as indicated by the modified bit 30 in the last level cache 14). In this example, where the modified bit 30 is not set, the data 24 of the evicted cache frame 23 may be simply written to the adaptive cache 34 per process block 82 (together with tag data D) avoiding a time-consuming read of adaptive cache 34 to check to see if the overwritten frame 29 was dirty in the adaptive cache 34.

When the adaptive cache 34 receives new writeback data from the last level cache 14', the cache controller 40 may schedule a writeback of this data to memory 16 even before there is any need to evict cache frames 29 in the adaptive cache 34. This scheduling may accommodate a measurement of the traffic to and from the main memory 16 so as not to preempt more urgent data transfers required by the executions of the cores 12. By actively writing back data to memory 16, the super-frames 46 may be cleaned improving their performance under the present invention.

Figure 6:
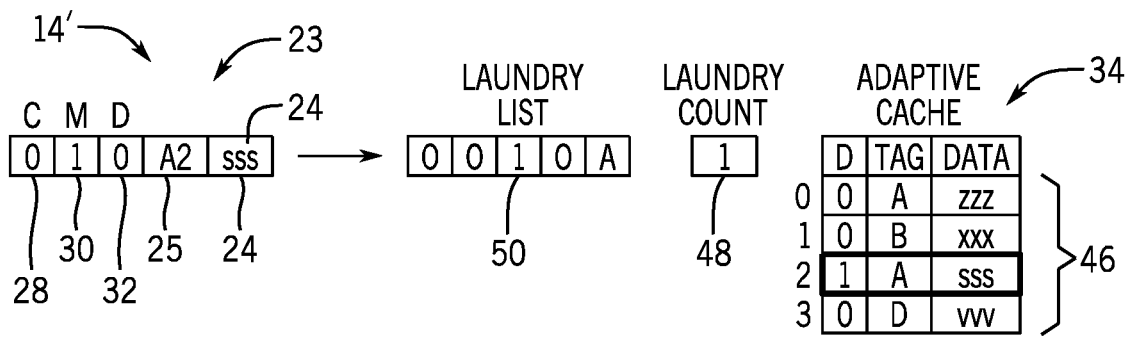

Consider now the example of FIG. 6 providing the write-back of a cache frame 23 having a set modified bit 30, a tag 42 of A and index 31 of 2, and data 24 of "sss". In this case, at decision block 80, the modified bit 30 is set, and accordingly the laundry counter 48 must be incremented (in this case from 0 to 1) at process block 81. At process block 81 the laundry list 50 also receives the value of tag 42 of the data being written back (in this case "A") indicating that although the cache 34 is not clean (e.g., all cache frames 29 are not associated with reset dirty bits 35) nevertheless all the dirty cache frames 29 relate to a single memory block 27 of main memory 16 (i.e. A). The dirty bit 35 for the laundry list 50 indicating the index of the memory block 27 holding the data 24 "sss" is also set to one (shown as the second bit of a bit vector being set) and at process block 82 the data is written to a cache frame 29 and the dirty bit 35 is set.

Figure 7:
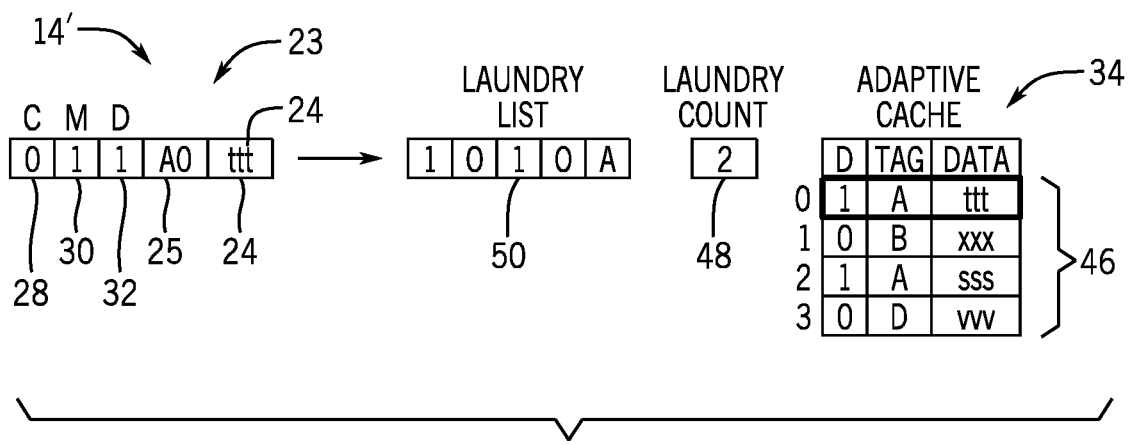

Referring now to FIG. 7, a next cache frame 23 to be evicted from the last level cache 14' may also have a set modified bit 30, a tag 42 of A and index 31 of 0, and block data 24 of "ttt". In this case, at decision block 78, laundry counter 48 is no longer zero so it cannot be assumed that all of the cache frames 29 are clean. Nevertheless, an efficient write-back can still be conducted through the use of the laundry list 50 as will now be discussed. From decision block 78, the program 70*b* moves to decision block 84 to check to see if there is a super-frame 46 matching the address 25 such as indicates whether a laundry list 50 exists. This is done using the cache access process discussed above with respect to FIG. 2 by checking for matching of the super-frame tag to identify a value of the laundry list 50. If a non-null value of laundry list 50 is obtained, then at decision block 86, this value is checked to see if it matches the tag 42 of the incoming write-back cache frame 23.

If so, again there is no need to read the adaptive cache 34 before writing data even though the super-frame 46 is not clean. This is because the incoming data either overwrites a clean cache frame 29 (e.g., line 3 in the cache 34 of FIG. 7 either of the same or a different block/tag) or updates a dirty cache frame 29 related to the same block 27 (e.g., line 2 of FIG. 7) not yet written back to main memory 16. Significantly, the incoming data 24 cannot overwrite a dirty cache frame 29 associated with a different block (e.g., tag B) because the presence of only the value A in the laundry list 50 implies that only blocks with valid tags A can be dirty.

In this situation, the program 70*b* then proceeds to process block 87 to see if the dirty bit 35 of the laundry list 50 for that index value 31 of the address 25 is set. If the bit is set, the program 70*b* proceeds directly to process block 82 without incrementing the laundry counter 48 because the data was implicitly modified in the lower level cache 14'. Otherwise, and as is the case here, at process block 87, if the dirty bit 35 is not set, the program 70*b* proceeds to decision block 88 to check whether the data was modified in the lower level cache 14'. If not, the program 70*b* may proceed directly to process block 82 again without incrementing the laundry counter 48 (because the incoming data 24 is clean and implicitly overwrites a clean cache frame 29. If, however, as is the case here, the incoming cache frame 23 is modified, the program 70*b* proceeds to process block 90, to set the appropriate dirty bit 35 in the laundry list 50 (shown logically by the number 0) and to increment the laundry counter 48.

Figure 8:
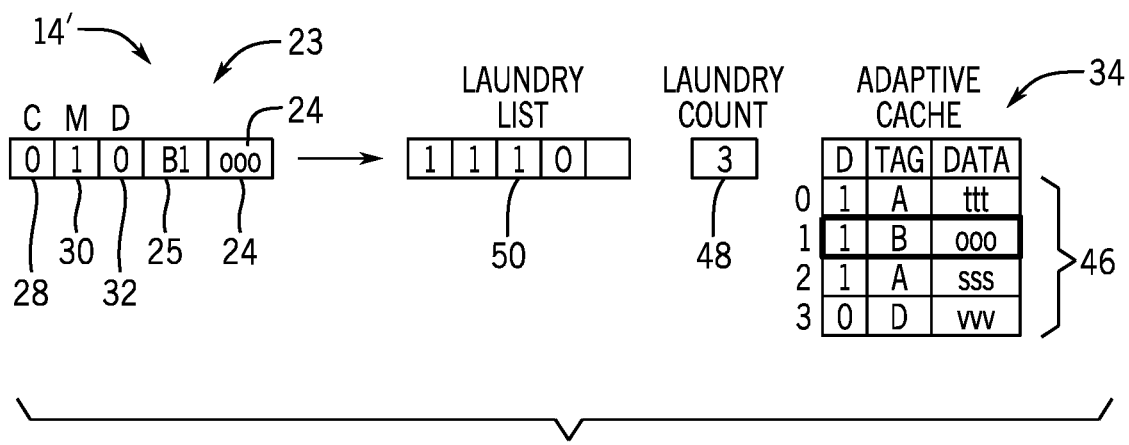

Referring now to FIG. 8, a next cache frame 23 to be evicted from the last level cache 14' may have a set modified bit 30, and the tag 42 of B and index 31 of 1, and hold data 24 of "ooo." In this case, at decision block 86, the laundry list 50 doesn't match the tag 42 of the incoming cache frame 23, and accordingly program 70*b* proceeds to decision block 95 to check to see if the dirty bit is set in the laundry list 50 to make sure the cache frame 29 to be overwritten isn't dirty. In this case, the dirty bit 35 is not enrolled in the laundry list 50. Accordingly, the program 70b may proceed to decision block 96 to determine whether the data from the LLC 14' was modified. If so, the program 70b proceeds to process block 97 and the laundry list 50 is invalidated and the laundry counter 48 incremented. The laundry list 50 is invalidated (for example, setting the valid bit 60 to 0) because it can no longer be relied upon to ensure that data from only a single block 27 of main memory 16 is dirty in the laundry list cache 36. Alternatively, if at decision block 96 the data from the LLC 14' was not modified, the program can proceed directly to process block 82 to write tag in data into the adaptive cache 34.

Referring again to FIG. 3, when at decision block 95 the dirty bit is set, the adaptive cache 34 must be read at process block 99 in a more conventional cache access scenario and data in the adaptive cache 34 must be written back to the main memory 16. After this writeback, it is determined whether the data from the lower level cache 14' was modified at decision block 100. If so, the program 70b proceeds to process block 101 to invalidate the laundry list 50 before proceeding to write the data to the adaptive cache at process block 82. If at decision block 96 the data was not modified in the lower level cache 14', the program 70b may proceed directly to process block 102 decrementing the laundry counter 48 and then to process block 82 to write to the adaptive cache 34.

Referring again to FIG. 3, in the case where the super-frame 46 does not match at decision block 84, it is also necessary to perform a more conventional pre-reading of the adaptive cache 34 as indicated by process block 94. After this reading, the program 70b proceeds to decision block 103 to determine whether the tag 42 of the incoming cache frame 23 matches the tag 42 of cache frame 29 of the adaptive cache 34. If so, the program proceeds to decision block 120 to decide the cache frame 29 is dirty by looking at its dirty bit 35. If so, the program proceeds to process block 82 to write to the adaptive cache 34. If not, the program proceeds to process block 122 to increment the laundry counter 48, then proceeds to process block 82.

If at decision block 103 the tag of incoming cache frame 23 did not match the tag of a cache frame 29 in the adaptive cache 34 then the program proceeds to decision block 121 to determine whether the frame 29 in the adaptive cache 34 was dirty by examining dirty bit 35. If so, the program proceeds to process block 107 to writeback the value from the adaptive cache 34. The program then proceeds to decision block 104 to determine whether the data from the last level cache 14' was modified. If so, the program proceeds directly to process block 82 to write the new data to the adaptive cache 34. If not, at process block 106 the laundry counter 48 is decremented and then the program proceeds to process block 82.

If at decision block 121 the program determines that the cache frame 29 is not dirty, the program proceeds to decision block 110, where it is determined whether the data from the lower level cache 14' was modified. If yes, the program proceeds to process block 112 to increment the laundry counter 48 and then proceeds to process block 82 to perform the writeback. If at decision block 110, the data from the lower level cache 14' was not modified, the program 70b proceeds directly to process block 82.

Referring now to FIG. 9, a more complete statement of the operation of the program 70b is in table form including error conditions not represented in FIG. 3. In this table, column 202 indicates the evaluation of the laundry counter 48 per decision block 78. Columns 204 and 205 refer to the cached laundry list 50 evaluated at decision blocks 84 and 86.

Column 206 indicates evaluation of the laundry list dirty bits 35, for example, at decision blocks 87 and 95. Column 207 refers to evaluation of a tag match between an incoming cache frame 23 with a tag 42 in a cache frame 29 in the adaptive cache 34 (shown in FIG. 1), for example, as evaluated at decision blocks 103. Column 208 refers to inspection of a dirty bit 35 in a cache frame 29 in the adaptive cache 34 (shown in FIG. 1), for example, as evaluated at decision blocks 120 and 121.

Column 210 represents the status of the modified bit 30 in the cache frame 23, for example, evaluated at decision blocks 80, 88, 100, 96, 104 and 110.

Column 214 represents the reading process of process blocks 94 and 99. Column 215 represents the write-back of the adaptive cache frame of process block 99 and 107 and column 216 represents the creation of a new laundry list item per process block 81. Column 217 represents setting of a dirty bit 35 in the laundry list item, for example, at process block 81 and 90. Column 218 represents invalidation of the laundry list, for example, at process blocks 97 and 101. Column 219 represents a decrementing of the laundry counter 48, for example, at process blocks 102 and 106 whereas column 220 represents an incrementing of the laundry counter 48, for example, at process blocks 81, 90, 112, and 122. When a row in the table calls for both decrementing and incrementing the laundry counter, as for example in rows 10 and 20, the net effect is to leave the laundry counter 49 unchanged. Finally, column 221 represents a writeback from the lower level cache of process block 82.

The following Table I provides notes keyed to FIG. 9.

TABLE I

| | |
|---|---|
| A | There are no dirty blocks in the super-frame so it is always safe to write without first reading the DRAM cache |
| B | There are some dirty blocks in the super-frame, and we know they all share the same physical tag with the request. Thus, it is safe to write. |
| C | There are some dirty blocks in the super-frame, and they all share the same physical tag, which is different from this request's. Thus, we must consult the dirty bit in the laundry list item to determine if it is safe to write. |
| D | There are some dirty blocks in the super-frame, and they may have different physical tags. We have no information about the dirty bits in the super-frame, so all accesses are unsafe. |

The program of FIG. 3 observes the following invariants:
1. The Laundry Count is Always Equal to the Number of Dirty Frames in the Super-Frame
Action 1
Whenever a dirty block is victimized from the adaptive cache, decrement the laundry counter
Action 2
Whenever a modified block overwrites a clean block (including victimized dirty blocks) in the adaptive cache, increment the laundry counter
2. If there is a Laundry List Item for a Super-Frame and the Physical Tag is Valid, then the Super-Frame in the Adaptive Cache Only Contains Dirty Data that Matches the Physical Tag.
Action 1
If the physical tag matches in the laundry list item, no need to read the adaptive cache before writing, it's always safe
Action 2
If a modified block is being written to the adaptive cache that doesn't match the physical tag in the laundry list item, invalidate the laundry list item 3. When there is a Valid Laundry List Item, the Laundry List Item Contains the Same Dirty Bits as the Adaptive Cache Super-Frame (and the Super-Fame Tag Must Match)

Action 1

On a dirty LLC-writeback, if there is a valid laundry list item only increment the laundry counter if the cache frame in the adaptive cache is not dirty.

Figure 10:
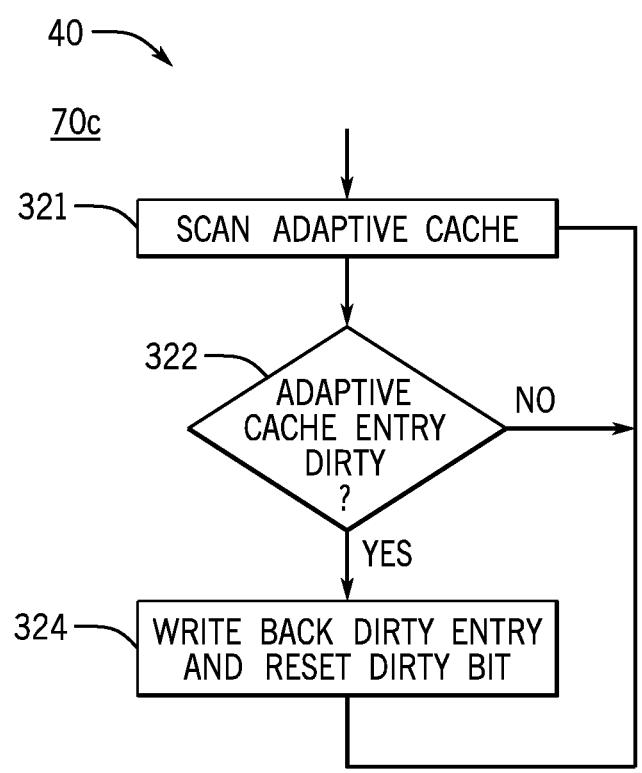
FIG. 10 is a flowchart showing a background write-back of dirty cache regions per one embodiment of the present invention.

Referring now to FIG. 10, the cache controller 40 may also execute a program 70c generally asynchronous with respect to program 70b to scan through the cache frames 29 of the adaptive cache 34 per process block 321 to identify per decision block 322 any cache frames 29 that are dirty as indicated by dirty bit 35. The data 24' of those cache frames 29 is written back to the main memory 16 per process block 324. When writing back dirty data, the corresponding entry in the laundry list 50 must be invalidated (if it exists, i.e., the super-frame tag matches). By ensuring that the adaptive cache 34 is mostly clean, the highest performance is obtained. The scanning process of process block 321 may monitor the bandwidth between the main memory 16 and the core-level caches 14 and adaptive cache system 18 to schedule the scanning processor so as not interfere with other data accesses involving the main memory 16. The scanning process may be part of the DRAM refresh logic used to refresh the memory of the adaptive cache 34.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

In the above description and should be understood that the terms "set" and "reset" may be arbitrarily mapped to Boolean states and voltage levels and accordingly these terms should be denoted as designating a logical setting and resetting rather than a particular mapping.

References to "a core" and "a processor" or "the microprocessor" and "the processor," can be understood to include one or more microprocessors that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

The term program is used herein represents operation of the computer architecture typically implemented in discrete logic and firmware. This operation may be distinguished from software that may be loaded onto a general-purpose computer without the architectural features described above.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

What we claim is:

1. A cache architecture comprising:
   an adaptive cache having regions holding cache frames storing data blocks cached from a main memory for use by one or more processors, each cache frame associated with a dirty bit that is set when the cache frame holds data that has been changed by a processor but has not been updated in the main memory and that is reset otherwise;
   a laundry counter associated with each region storing a count value; and
   a cache controller operating to:
   (a) update the laundry counters during operation of the cache architecture to indicate whether an associated region has any set dirty bits;
   (b) write data to a given cache frame in the region in a first mode without first reading the dirty bit of the cache frame based on a determination that the associated laundry counter indicates no dirty frames in the region; and
   (c) write data to a given cache frame in a second mode based on a determination that the associated laundry counter indicates at least one dirty frame in the region after first reading the dirty bit of the given cache frame to ensure that the given cache frame dirty bit is not set.

2. The cache architecture of claim 1 wherein the laundry counter indicates a number of dirty bits in the region and is incremented based on a determination that a cache frame in the region has a dirty bit changed from reset to set and decremented based on a determination that a cache frame in the region has a dirty bit changed from set to reset.

3. The cache architecture of claim 1 wherein the cache controller operates in the second mode to write-back data of the given cache frame to the main memory before writing data to the cache frame based on a determination that the reading of the dirty bit of a given cache frame indicates that the dirty bit is set and a data block of the given cache frame does not match a data block of data being written back to the given cache frame.

4. The cache architecture of claim 1 wherein the laundry counter is held in a separate memory from a memory holding the adaptive cache, the separate memory providing faster access by the processor and the memory holding the adaptive cache.

5. The cache architecture of claim 4 wherein the laundry counter is held in a static random-access memory (SRAM) and the adaptive cache is held in a dynamic random-access memory (DRAM).

6. The cache architecture of claim 5 wherein the DRAM employs a three-dimensional die stacking integrated circuit architecture.

7. The cache architecture of claim 1 wherein the cache frames of the adaptive cache are further associated with tags corresponding to addresses in main memory of the data held in the cache frames and wherein the cache architecture further comprises:
a laundry list associated with each region indicating a tag of a cache frame associated with a set dirty bit; and wherein the cache controller further operates to:
write data having a given tag to a given cache frame in a third mode without first reading the dirty bit of the given cache frame based on a determination that the given tag is in the laundry list.

8. The cache architecture of claim 7 wherein the laundry list further includes laundry list dirty bits corresponding to dirty bits associated with the cache frames in the corresponding region.

9. The cache architecture of claim 8 wherein the cache controller reviews the laundry list dirty bits and determines whether to update the laundry list counter based on the laundry list dirty bits.

10. The cache architecture of claim 8 wherein the laundry counter is incremented based on a determination that the laundry list dirty bits associated with the given cache frame are not set.

11. The cache architecture of claim 7 wherein the laundry list is held separate memory from a memory holding the adaptive cache, the separate memory providing faster access by the processor and the memory holding the adaptive cache.

12. The cache architecture of claim 7 wherein the laundry list held in a laundry list cache provides fewer laundry list entries than regions of the adaptive cache.

13. The cache architecture of claim 1 wherein the cache controller schedules a write-back of data written into the adaptive cache to main memory at a time of writing of data to the adaptive cache.

14. The cache architecture of claim 12 wherein the schedule of the write-back of dirty cache frames is based on a measurement of a flow of data between the main memory and the one or more processors.

15. The cache architecture of claim 1 wherein the cache controller further operates to write-back dirty cache frames to main memory on a predetermined schedule independently of writing to the adaptive cache from the processor.

16. The cache architecture of claim 13 wherein the write-back of dirty cache frames is coordinated with a refresh of dynamic adaptive cache memory.

17. A computer architecture comprising:
multiple processing cores executing arithmetic and logical instructions each associated with one or more lower level caches including a last lower-level cache (LLC) having corresponding lower-level cache controllers;
a main memory exchanging data with the multiple processing cores;
an adaptive cache positioned between the lower level caches and the main memory and including:
(a) a cache having regions of cache frames storing data cached from a main memory for use by a processor, each cache frame associated with a dirty bit that is set based on a determination that the cache frame holds data that has been changed by the processor but has not been updated in the main memory and that is reset otherwise;
(b) a laundry counter associated with each region storing a count value; and
(c) a cache controller operating to:
(i) update the laundry counters during access of the adaptive cache to indicate whether an associated region has any set dirty bits:
(i) write data to a given cache frame in the region in a first mode without first reading the dirty bit of the cache frame based on a determination that the associated laundry counter indicates no dirty frames in the region; and
(i) write data to a given cache frame in a second mode based on a determination that the associated laundry counter indicates at least one dirty frame in the region after first reading the dirty bit of the given cache frame to ensure that the given cache frame dirty bit is not set.

18. The computer of claim 17 wherein entries of the LLC include LLC data, a clean-evict bit set to indicate that the LLC data is not in the adaptive cache, a modified bit set to indicate that the processor modified the LLC data in the LLC and wherein the lower-level cache controllers elide a write-back of data evicted from the LLC based on a determination that neither the clean-evict bit nor the modified data is set.

19. The computer of claim 17 wherein entries of the LLC further include a modified bit set to indicate that the LLC data has been modified by a processor and wherein the laundry counter value is incremented based on a determination that data written to a given cache frame is associated with a set modified bit.

* * * * *